United States Patent [19]

Clark

[11] 3,774,874
[45] Nov. 27, 1973

[54] MOLD DESIGN INCORPORATING A COLLET

[75] Inventor: Paul P. Clark, Sturgis, Mich.

[73] Assignee: Sturgis Molded Products Company, Sturgis, Mich.

[22] Filed: Apr. 19, 1971

[21] Appl. No.: 135,346

[52] U.S. Cl............... 249/59, 425/436, 249/67, 249/68, 249/74
[51] Int. Cl............................................. B29f 1/14
[58] Field of Search ............... 249/59, 67, 68, 74, 249/183; 425/249, 436, 444

[56] References Cited
UNITED STATES PATENTS
3,020,594   2/1962   Makowski...................... 249/59 X
3,125,801   3/1964   Fields............................. 249/59 X Primary Examiner—J. Spencer Overholser
Assistant Examiner—David S. Safran
Attorney—Woodhams, Blanchard and Flynn

[57] ABSTRACT

An improved mold construction having coacting separable mold parts for permitting formation of a cup-shaped molded product. One of the mold parts is provided with a core pin which coacts with the other mold part to define a cup-shaped mold cavity therebetween. The one mold part also has a resilient collet movably mounted thereon in surrounding relationship to the core pin. The collet, which defines a part of mold cavity, has a radial irregularity, such as a helical groove, formed in the jaws thereof for permitting formation of a desired radial irregularity on the molded product. The mold construction includes an ejection mechanism which is movable longitudinally of the core pin for ejecting the molded product. The ejection mechanism also causes limited movement of the collet to enable the jaws thereof to move resiliently radially and disengage the radial irregularity formed on the molded product prior to complete ejection of the molded product.

13 Claims, 5 Drawing Figures

MOLD DESIGN INCORPORATING A COLLET

FIELD OF THE INVENTION

This invention relates to an improved mold construction and, in particular, to a mold construction which utilizes a resilient collet having a radially extending irregularity, such as a helical groove, for permitting formation of a molded product having a radial irregularity, such as a helical thread, integrally formed thereon.

BACKGROUND OF THE INVENTION

The formation of molded containers having radial irregularities, such as integral screw threads, thereon has long constituted a molding problem due to the complexity of the mold structure usually required to obtain a product of good quality. Containers having screw threads molded thereon are often formed utilizing molds having a large number of separable mold parts, such as three or more. These known mold structures generally utilize separable upper and lower mold parts for defining the external and internal peripheries of the mold cavity. However, when the molded product is to have an integral screw thread formed thereon, then one of the mold parts often consists of at least two separable sections, each having one half of the mold cavity and screw thread formed therein, which separable mold sections are each laterally movable to permit the mold sections to be disengaged from the thread.

While mold structures of the above-described type have been widely used, nevertheless such mold structures are often undesirable since their utilization is time-consuming and inefficient, particularly if a high quality product is essential. Further, mold constructions of this type often result in formation of a ridge on the thread and on the external surface of the molded product due to the parting line which exists between the separable sections. This tends to destroy the appearance of the molded product, and often impairs its function.

Accordingly, it is an object of the present invention to provide an improved mold construction for permitting formation of an article or product having radial irregularities thereon, such as ribs, screw threads or recesses, which mold structure overcomes the above-mentioned disadvantages. Particularly, it is an object of the present invention to provide:

1. A mold construction, as aforesaid, capable of molding an article having radial irregularities, such as integral screw threads, such as a cup-shaped container having screw threads adjacent the free edge thereof.

2. A mold construction, as aforesaid, which utilizes a resilient collet for forming the radial irregularities with the collet automatically disengaging the irregularities upon ejection of the article.

3. A mold construction, as aforesaid, which includes upper and lower separable mold parts with one of the mold parts having a core pin and a collet disposed in surrounding relationship to the core pin, whereby the core pin and collet cooperate with the other mold part to define a mold cavity therebetween.

4. A mold construction, as aforesaid, wherein the one mold part has an ejection mechanism for dislodging the molded article from the core pin, which ejection mechanism includes an ejection sleeve slideably mounted on the core pin and disposed between the core pin and the collet.

5. A mold construction, as aforesaid, wherein the collet is mounted for limited movement and coacts with the ejection mechanism for initial movement therewith to permit expansion of the collet jaws out of engagement with the irregularity to permit ejection of the article.

6. A mold construction, as aforesaid, which is easy and economical to manufacture and operate, and which is capable of efficiently and rapidly producing screw-threaded articles or containers of high quality.

These and other objects of the present invention will be apparent to persons acquainted with devices of this type upon reading the following specification and inspecting the accompanying drawings.

Figure 2:
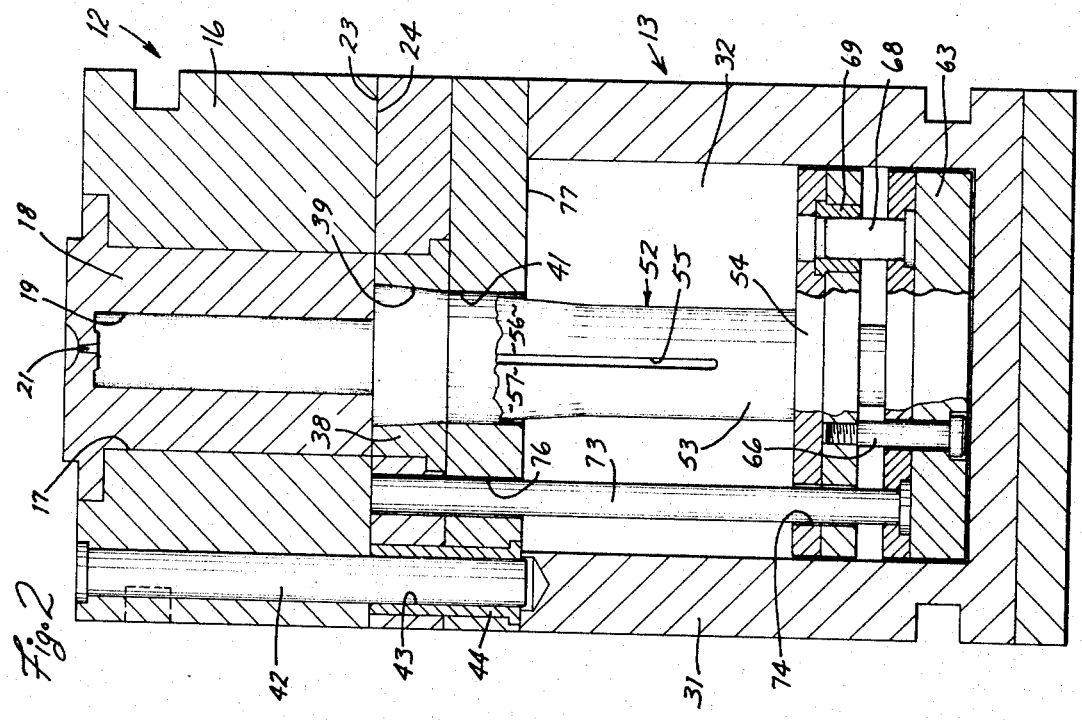
FIG. 2 is a sectional elevational view taken along the line II—II of FIG. 3, with part of the internal mold structure being removed for purposes of clarity.

Certain terminology will be used in the following description for convenience in reference only and will not be limiting. The words "upwardly", "downwardly", "rightwardly" and "leftwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof, and words of similar import.

SUMMARY OF THE INVENTION

The objects and purposes of the present invention are met by an improved mold construction which includes separable mold parts which define a mold cavity therebetween for permitting formation of a cup-shaped article. The one mold part has a core pin which extends into a recess formed in the other mold part for defining the mold cavity therebetween. Said one mold part also has a collet disposed in surrounding relationship to and movable relative to the core pin. The collet has jaws abutting against the other mold part, which jaws define a part of the mold cavity. The jaws in the illustrated embodiment have a continuous helical groove formed therein for permitting formation of a screw thread integral with the article. An ejection mechanism is also mounted on said one mold part and includes an ejector sleeve slideably disposed between the core pin and the collet. The ejection mechanism coacts with the collet and causes movement thereof over a predetermined distance for permitting the collet to resiliently disengage the article simultaneous with the removal of the article from the core pin.

DETAILED DESCRIPTION

The drawings illustrate therein a mold structure 11 constructed according to the present invention, which mold structure includes separable upper and lower mold parts 12 and 13 coacting to define a mold cavity 14 therebetween. The mold cavity 14 has a generally inverted, cup-shaped configuration to permit formation of a molded article or container.

The upper mold part 12 includes a tubular, here cylindrical, housing 16 which has an opening 17 therethrough. A liner 18 is snugly but removably disposed within the opening 17, which liner 18 has a cylindrical opening 19 therein. The upper end of the liner 18 has a sprue opening 22 for communication with the cylindrical opening 19. The cylindrical housing 16 also has suitable coolant passages 22 formed therein.

Figure 1:
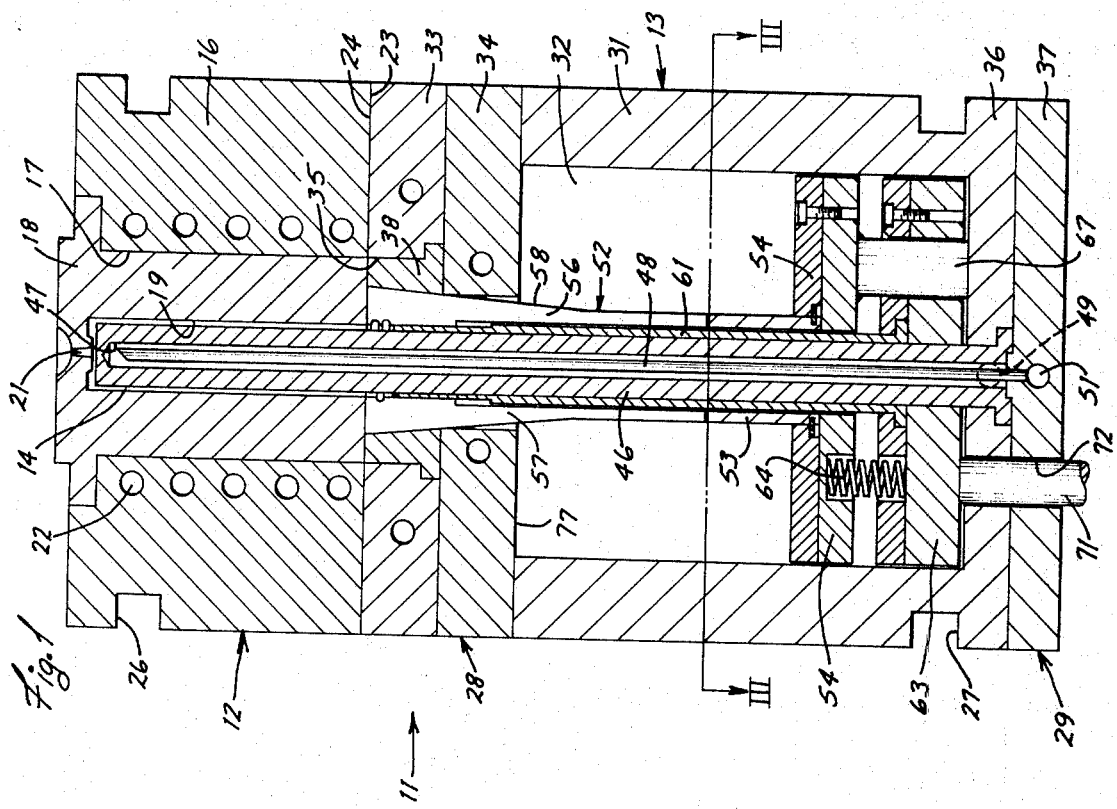
FIG. 1 is a central sectional view of a mold construction according to the present invention, same being illustrated in the closed position and taken along the line I—I of FIG. 3.

The upper mold part 12 has a substantially planar bottom surface 23 which is adapted to be seated on the substantially planar upper surface 24 of the lower mold part 13. The surfaces 23 and 24 define the mold parting plane. The upper and lower parts 12 and 13, when disposed as illustrated in FIGS. 1 and 2, are suitably clamped together in any conventional manner, as by means of clamping mechanisms extending between and engaged within the grooves 26 and 27.

The lower mold part 13 includes top and bottom walls 28 and 29 fixedly interconnected by a substantially cylindrical side wall 31 which defines therein a chamber 32. The top wall 28, in the illustrated embodiment, comprises a pair of plates 33 and 34 fixedly secured together, as by means of screws, and the bottom wall 29 similarly comprises a pair of plates 36 and 37 also suitably fixedly secured, as by screws.

The top plate 33 has an enlarged central opening 35 in which is fixedly seated a guide ring 38. The guide ring 38 has an internal truncated conical surface 39 which defines an opening substantially coaxially aligned with a further, here cylindrical, opening 41 formed in the other top plate 34. The aligned openings 39 and 41 are adapted to be disposed in coaxial alignment with the cylindrical recess 19 formed in the upper mold part 12 when the mold parts are connected one to the other.

To permit the upper and lower mold parts 12 and 13 to be properly aligned with one another, the upper mold part 12 is provided with a plurality of elongated guide pins 42 (FIG. 2) slideably mounted thereon, only one of which is shown in the drawings. The guide pins 42 project downwardly beyond the lower surface 23 and are adapted to slideably but snugly extend into openings 43 defined by the bushings 44 mounted on the upper wall 28 of the lower mold part 13.

Considering now the detailed structure of the lower mold part 13, same includes an elongated, substantially vertically extending core pin 46 having the lower end thereof fixedly secured to the bottom wall 29. The core pin 46 extends through the openings 39 and 41 and is received within the cylindrical recess 19 when the upper mold part 12 is disposed on the lower mold part 13, thereby resulting in formation of the mold cavity 14. The core pin 46 has an elongated passage 47 extending throughout a major portion of the length thereof, and a further hollow tube 48 is disposed within and extends longitudinally of the passage 47. The upper end of the tube 48 is open to permit communication between the interior of the tube 48 and the surrounding passage 47. The lower ends of the passage 47 and the tube 48 communicate with suitable passages 49 and 51, respectively, formed in the bottom wall 29 for permitting a temperature controlling fluid to freely circulate through the interior of the core pin 46.

The lower mold part 13 also includes a one-piece collet 52 disposed in surrounding relationship to the core pin 46 and coacting therewith to define the lower end of the mold cavity 14. The collet 52 is of substantially conventional construction and includes a tubular portion 53 fixedly connected at its lower end to a movable piston 54. The upper end of the collet is provided with axial slits 55 (exaggerated in the drawing) which define a plurality of resilient jaws, such as the jaws 56 and 57, disposed in surrounding relationship to and spaced radially from the core pin 46. The jaws 56 and 57 define an external, substantially continuous conical surface 58 which is adapted to coact with the conical surface 39 formed on the guide ring 38. The collet jaws 56 and 57 are sized such that the upper ends thereof are disposed flush with the upper surface 24 when the collet is in the fully retracted (molding) position illustrated in FIG. 1. Further, when in the fully retracted position illustrated in FIG. 1, the jaws 56 and 57 define therebetween an opening having a diameter equal to the diameter of the cylindrical recess 19, whereby the upper ends of the collet jaws in association with the core pin define therebetween the lower portion of the mold cavity 14.

Figure 5:
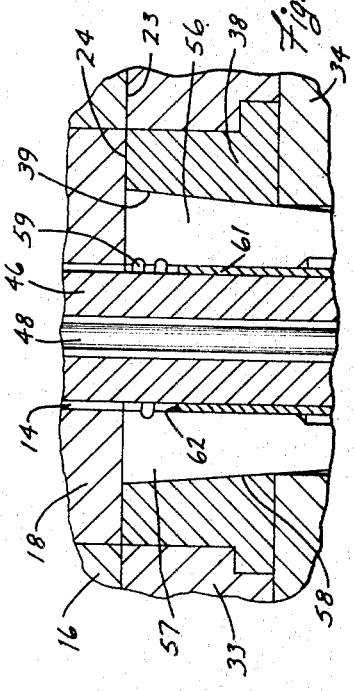
FIG. 5 is an enlargement of a portion of the mold structure illustrated in FIG. 1.

The jaws 56 and 57, when in the retracted position of FIG. 1, are deflected inwardly toward one another to an extent sufficient to cause the jaws to be disposed substantially in abutting contact with one another to thereby form a substantially continuous annular member. Further, the jaws 56 and 57 have a continuous helical groove 59 (FIG. 5) formed in the inner surface thereof, which groove communicates with and constitutes a portion of the mold cavity 14 for permitting formation of an integral helical thread on the article formed within the mold cavity 14.

To permit removal of the molded article or container from the core pin 46, the lower mold part 13 is provided with an ejection device which includes an ejector sleeve 61 snugly but slideably disposed on the core pin 46. The ejector sleeve 61 is disposed within the collet 52 and has the upper end 62 (FIG. 5) thereof disposed adjacent but spaced downwardly a small distance from the upper end of the collet jaws for enabling the helical groove 59 as formed on the collet jaws to be in communication with the mold cavity. The upper end 62 of the ejector sleeve 61 thus defines the lower surface of the mold cavity 14.

The lower end of the ejector sleeve 61 is fixedly anchored to a second piston 63 which is slideably disposed within the chamber 32 and is axially positioned between the bottom wall 29 and the first piston 54. The pistons 54 and 63 have a plurality of conventional compression springs 64 disposed therebetween for normally resiliently urging the pistons axially apart. However, the axial spacing between the pistons is limited by suitable stop pins 66 which comprise screw members threadedly engaged at one end with the upper piston 54 and slideably extending through an opening formed in the lower piston 63. The head of the screw 66 functions as a stop for limiting the axial separation between the pistons. The springs 64, in cooperation with the stops 66, maintain the pistons 54 and 63 a predetermined distance apart, as illustrated in FIGS. 1 and 2.

A further stop pin 67 coacts between the upper piston 54 and the bottom wall 29 for maintaining the piston 54 spaced at least a predetermined distance from the wall 29 when the piston 54 is in its lowermost position. As illustrated, the stop pin 67 is fixedly secured to the piston 54 and slideably extends through an opening formed in the bottom piston 63 for permitting the stop pin to abuttingly engage the bottom wall 29. However, if desired, the stop pin 67 could be fixedly secured to the bottom wall and disposed for abutting engagement with the upper piston 54. Suitable guide pins 68 are also fixedly anchored to the lower piston 63 and are snugly but slideably guided within bushings 69 provided on the upper piston 54 for permitting relative axial movement between the pistons while preventing any relative angular displacement therebetween.

The pistons 54 and 63 are movable longitudinally of the chamber 32 by means of a push rod 71 which slideably extends through an opening 72 formed in the bottom wall 29 and is fixedly or abuttingly engaged with the piston 63. The push rod 71 is connected to any suitable external power source, such as a fluid pressure cylinder, for enabling upward movement of the pistons. While only a single push rod 71 is illustrated in the drawings, a plurality of push rods disposed uniformly about the core pin 46 can be provided, if desired, to permit the pushing force to act effectively along the axial centerline of the pistons.

The pistons are guided during their longitudinal movement by a plurality of elongated guide rods 73 (FIG. 2) which have their lower ends fixedly anchored to the bottom piston 63. The guide rods 73 slideably extend through suitable openings 74 formed in the upper piston 54, and are further slideably guided by further openings 76 formed in the top wall 28.

OPERATION

The operation of the mold structure of the present invention will be briefly described to insure a complete understanding thereof.

Assuming first that the mold structure is in the assembled position illustrated in FIGS. 1 and 2, in which position the upper and lower mold parts 12 and 13 are clampingly connected and define the cup-shaped mold cavity 14 therebetween. In this position, the upper piston 54 is seated against the stop pins 67 and the springs 64 resiliently urge the lower piston 63 downwardly so that same is disposed directly against the bottom wall 29. When in this assembled position, the jaws of the collet 52 are deflected inwardly toward one another due to their engagement with the tapered conical surface 39, whereupon the jaws form a substantially continuous annular member which is disposed in surrounding relationship to but slightly spaced from the core pin 46. The upper ends of the jaws thus effectively define the lowermost portion of the mold cavity 14.

With the mold structure assembled as described above, suitable molten material, such as a molten or flowable plastic, is injected through the opening 21 into the mold cavity 14 so that the plastic totally fills the cavity 14, including the helical groove 59. This thus results in formation of a cup-like article having an integral helical thread formed on the external peripheral wall adjacent the free edge or open end of the article. After the article formed within the cavity 14 has sufficiently cooled, the upper mold part 12 is removed whereby the molded article remains positioned on the extending portion of the core pin 46.

The push rod 71 is then moved inwardly to cause the lower piston 63 to slide upwardly, whereupon the ejector sleeve 61 is also moved upwardly along the core pin 46 to cause a corresponding upward movement of the molded article. The springs 64 disposed between the pistons 54 and 63 are relatively stiff and thus the upper piston 54 is moved in synchronization with the lower piston 63, thereby causing the collet 52 to move upwardly in correspondence with the ejector sleeve 61. As the collet moves upwardly beyond the surface 24, the resiliency of the collet jaws causes the jaws to spread radially outwardly away from the core pin, whereupon the collet jaws release or disengage the integral helical thread formed on the molded article. This simultaneous movement of the collet and ejector sleeve thus prevents damage to the molded thread.

Figure 4:
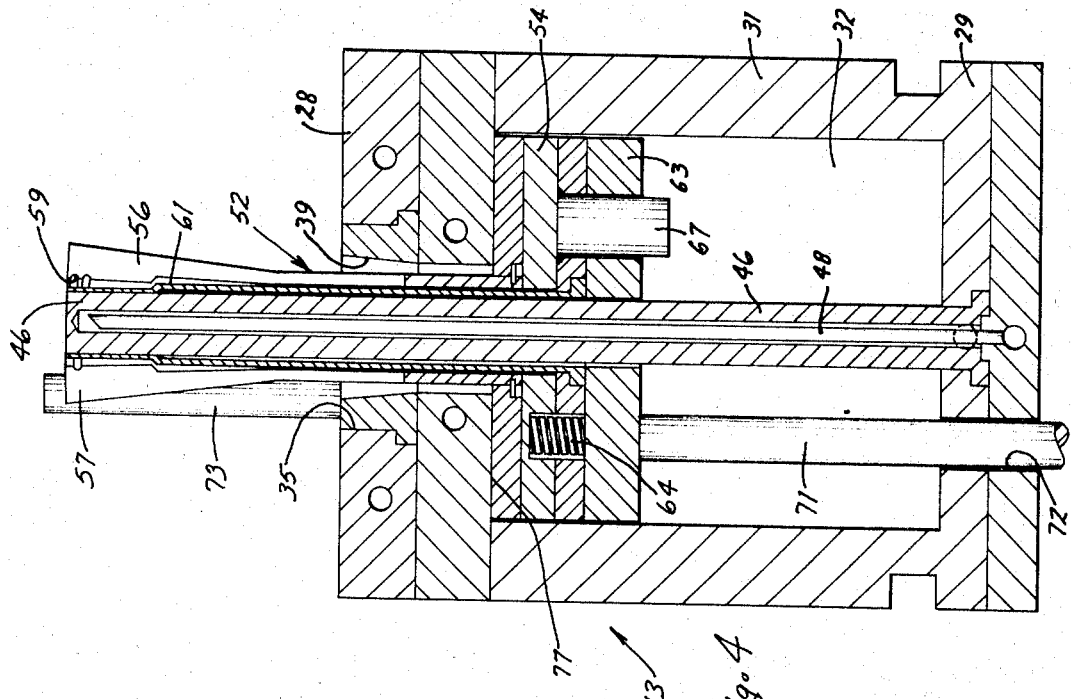
FIG. 4 is a sectional view similar to FIG. 1 but illustrating therein only the lower mold part when same is disposed in the release or ejection position.
Figure 3:
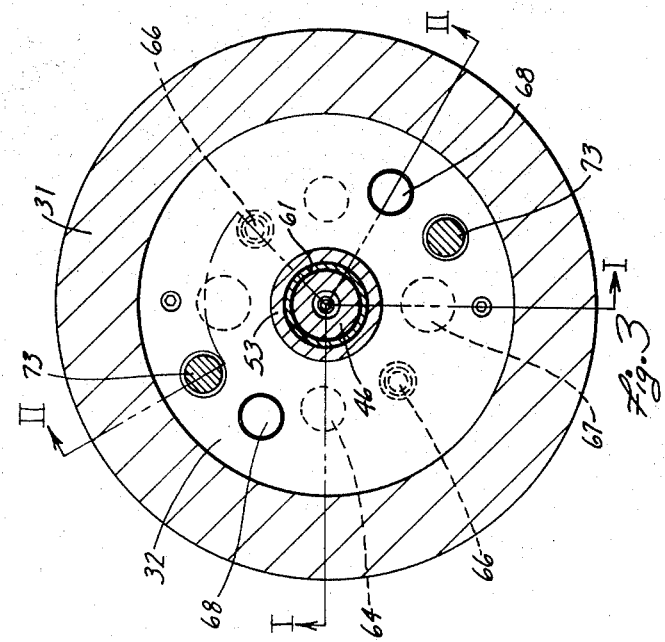
FIG. 3 is a horizontal sectional view taken substantially along the line III—III of FIG. 1.

The push rod 71 is continuously urged inwardly until the piston 54 is disposed in abutting engagement with the inner surface 77 of the upper wall 28, whereupon further movement of upper piston 54 and collet 52 is prevented. However, the push rod 71 is continuously urged inwardly until the springs 64 are compressed and the lower piston 63 is disposed directly against the upper piston 54 (as illustrated in FIG. 4), which additional movement of the lower piston 63 causes the ejector sleeve 61 to be moved upwardly so that the upper free end thereof is disposed directly adjacent the free upper end of the core pin 46 and substantially at the same elevation as the upper end of the collet 52, thereby permitting the molded article to be totally ejected from the core pin.

After the molded article has been ejected, the pistons 54 and 63 are returned to their initial positions (as illustrated in FIGS. 1 and 2), either by applying a pulling force to the push rod 71 or by applying an external downward force to the free ends of the collet and ejector sleeve. When the pistons are again in their original position, the upper mold part 12 is again positioned on the lower mold part with proper alignment being maintained by means of the guide pins 42 being disposed within the guide bushings 44. The mold parts 12 and 13 are again clamped together to permit a further molding operation.

While the invention as disclosed above uses a helical groove 57 on the collet jaws, the groove 57 could have any desired configuration, such as a continuous annular groove, a plurality of annular or helical segments and could be an inward projection instead of a groove. Similarly, while the drawing shows a molded product and mold parts of circular cross-section, it will be evident that tubular parts of other cross-sections, polygonal, elliptical, D-shaped, C-shaped, and others, are also appropriate.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A mold construction for forming a molded product having a tubular portion and a radial irregularity formed integrally in or on the tubular portion, comprising:

mold means including first and second separable mold parts cooperating to define therebetween a generally tubular mold cavity;

one of said mold parts including collet means defining a portion of the periphery of said mold cavity, said collet means comprising an elongated, tubular, one-piece collet member having a plurality of slits extending axially inwardly from one end thereof, said slits dividing said one end of said collet member into a plurality of circumferentially spaced resilient jaws disposed in an annular configuration and movable radially between an operative, or molding, and an inoperative, or release, position, said jaws having wall means which define one wall of said mold cavity when said jaws are in said operative position, and said wall means having a radial irregularity in continuous communication with said mold cavity when said jaws are in said operative position for permitting formation of an integral radial irregularity on or in the tubular portion of said molded product;

means coacting with said jaws of said collet means for permitting movement of said jaws between said operative and inoperative positions, said jaws when in said inoperative position being disengaged from the radial irregularity; and said mold means including opening means therein in communication with said mold cavity for permitting a moldable material to be supplied to said mold cavity for filling same.

2. The device of claim 1, wherein the collet means moves from its operative position radially outwardly to its release position, wherein said plurality of jaws form an annular sleevelike body having inner and outer annular peripheral surfaces, one of said inner and outer annular surfaces having a conical configuration disposed for coaction with a similar conical surface formed on the other mold part, whereby movement of said collet means in its axial direction relative to said other mold part causes said conical surfaces to coact for permitting said jaws to be moved between said operative and inoperative positions, and said radial irregularity being associated with the other annular surface of said sleevelike body and positioned substantially radially opposite the conical surface formed on said collet means.

3. A mold construction for forming a molded product having a tubular portion and a radial projection integral with the tubular portion, comprising:

mold means including first and second separable mold parts cooperating to define therebetween a closed, annular, ringlike mold cavity;

one of said mold parts including collet means defining a portion of the periphery of said mold cavity, said collet means comprising an elongated, tubular, one-piece collet member having a plurality of slits extending axially inwardly from one end thereof, said slits dividing said one end of said collet member into a plurality of circumferentially spaced resilient jaws disposed in an annular configuration and movable radially between an operative and an inoperative position, said jaws having wall means which define a portion of the periphery of said mold cavity when said jaws are in said operative position, and said wall means having groove means formed therein in continuous communication with said mold cavity when said jaws are in said operative position for permitting formation of an integral radial projection on the tubular portion of said molded product;

means coacting with said jaws of said collet means for permitting movement of said jaws between said operative and inoperative positions, said jaws when in said inoperative position being disengaged from the radial projection; and said mold means including opening means therein in communication with said mold cavity for permitting a moldable material to be supplied to said mold cavity for filling same.

4. A mold construction according to claim 3, wherein said groove means as formed in said jaw means is arranged in a helical pattern to permit formation of a helical screw thread on said molded product.

5. A mold construction according to claim 3, wherein said resilient jaws are normally resiliently urged radially outwardly into said inoperative position, and said groove means being formed on the inner peripheral surface of said jaws.

6. A mold construction for forming a molded tubular product having integral radially projecting rib means substantially encircling same, comprising:

mold means including first and second separable mold parts coacting to define a mold cavity therebetween;

said first mold part having first wall means thereon defining a first portion of the surface of said mold cavity;

said second mold part having second wall means thereon defining the remaining portion of the surface of said mold cavity;

said first mold part including a mold element having a recess therein, and said second mold part including a core adapted to extend into said recess for at least partially defining said mold cavity therebetween;

said second mold part including a one-piece tubular collet disposed in surrounding relationship to said core and having a plurality of resilient jaws disposed in an annular configuration and movable in a substantially radial direction between open and closed positions, said jaws when in said closed positon being disposed directly adjacent and in alignment with said recess for defining at least a part of said remaining portion of said mold cavity surface, whereby a portion of said mold cavity is defined between said core and said jaws;

said jaws further having annular groove means formed therein with said groove means communicating with and comprising a part of said mold cavity when said jaws are in said closed position, actuator means coacting with said collet for forcibly moving said jaws into one of said open and closed positions, said jaws being normally resiliently urged in a direction toward the other of said open and closed positions; and said mold means having opening means therein communication with said mold cavity for permitting a moldable material to be supplied to said mold cavity for filling said cavity, including said annular groove means, to permit formation of a tubular molded product having radially directed rib means integrally connected thereto and substantially encircling same.

7. A mold construction according to claim 6, further including means mounting said collet on said second mold part in surrounding but slideable relationship relative to said core.

8. A mold construction according to claim 6, further including ejection means coacting with said first mold part for removing said tubular molded product from said core after said first mold part has been separated from said second mold part, said ejection means including an ejector sleeve positioned within said tubular collet and slideably disposed on said core in surrounding relationship thereto.

9. A mold construction according to claim 8, wherein said collet is mounted for axial displacement relative to both said core and said ejector sleeve.

10. A mold construction according to claim 9, further including separation means coacting between said ejector sleeve and said collet for normally maintaining same in a predetermined relationship relative to one another while permitting relative movement between said collet and said ejector sleeve during a part of the ejection stroke of the ejector sleeve.

11. A mold construction according to claim 10, further including actuator means operatively associated with said ejector sleeve for permitting simultaneous linear movement of said ejector sleeve and said collet in the longitudinal direction of said core for permitting ejection of said molded product from said core after said first mold part has been separated from said second mold part; and said first mold part having stationary wedge means mounted thereon and coacting with said collet for forcing said jaws radially inwardly to said closed position whenever said collet is in one extreme position, movement of said collet to its other extreme position by said actuator means enabling said jaws to be resiliently moved radially outwardly to said open position to permit said jaws to disengage the rib means formed on said tubular product.

12. A mold construction according to claim 11, further including stop means mounted on said first mold part and coacting with said collet for defining said other extreme position, said actuator means causing movement of said ejector sleeve relative to said collet for permitting said tubular product to be completely ejected from said core.

13. A mold construction according to claim 6, wherein the annular groove means formed in said collet jaws comprises an annular helical groove to permit formation of a helical screw thread on said tubular product.

* * * * *